United States Patent
Sabo et al.

(10) Patent No.: US 8,123,936 B1
(45) Date of Patent: Feb. 28, 2012

(54) WASTEWATER TREATMENT SYSTEM WITH ULTRAVIOLET UNIT

(75) Inventors: Stephen A. Sabo, South Bend, IN (US); Steven G. Davis, Plymouth, IN (US); James J. Conley, Plymouth, IN (US)

(73) Assignee: A.K. Industries, Inc., Plymouth, IN (US)

( * ) Notice: Subject to any disclaimer, the term of this patent is extended or adjusted under 35 U.S.C. 154(b) by 0 days.

(21) Appl. No.: 12/949,160

(22) Filed: Nov. 18, 2010

(51) Int. Cl.
*B01D 33/70* (2006.01)

(52) U.S. Cl. ...................................... 210/151; 210/532.2

(58) Field of Classification Search .................. 210/620, 210/631, 748.11, 764, 532.2, 150–151
See application file for complete search history.

(56) References Cited

U.S. PATENT DOCUMENTS

| | | | | |
|---|---|---|---|---|
| 4,650,577 A | * | 3/1987 | Hansel | 210/195.3 |
| 4,882,046 A | * | 11/1989 | Waite | 210/195.3 |
| 5,352,357 A | * | 10/1994 | Perry | 210/150 |
| 5,840,196 A | * | 11/1998 | Laurent | 210/748.11 |
| 6,096,203 A | | 8/2000 | Drewery | |
| 6,180,004 B1 | | 1/2001 | Drewery | |
| 6,224,752 B1 | | 5/2001 | Drewery | |
| 6,228,258 B1 | * | 5/2001 | Donald et al. | 210/195.3 |
| 6,309,551 B1 | * | 10/2001 | Suchecki et al. | 210/744 |
| 6,638,420 B2 | * | 10/2003 | Tyllila | 210/86 |
| 6,949,187 B2 | * | 9/2005 | Smith | 210/207 |
| 6,949,191 B1 | * | 9/2005 | Petrone | 210/619 |
| 6,982,033 B2 | * | 1/2006 | Donald et al. | 210/207 |
| 2005/0040107 A1 | * | 2/2005 | Kasparian et al. | 210/636 |
| 2006/0283793 A1 | * | 12/2006 | Reiling | 210/532.2 |
| 2007/0095737 A1 | * | 5/2007 | McKinney | 210/220 |
| 2007/0215542 A1 | * | 9/2007 | McKinney | 210/605 |
| 2008/0283455 A1 | * | 11/2008 | McKinney | 210/96.1 |

* cited by examiner

*Primary Examiner* — Chester Barry
(74) *Attorney, Agent, or Firm* — Botkin & Hall, LLP

(57) ABSTRACT

A wastewater treatment system for processing borne wastewater. The treatment system having a tank with an inlet and an outlet and an access assembly residing at the top of the treatment tank. The treatment tank having an aeration chamber where oxygen is added to the wastewater to encourage bacterial breakdown of the solid waste. The treatment tank also having a clarifying chamber separated by a frusto-conical wall. The treatment tank also containing an ultraviolet disinfection system which exposes the wastewater to ultraviolet light prior to the wastewater exiting the treatment tank such that bacteria in the wastewater is neutralized prior to discharge.

2 Claims, 3 Drawing Sheets

WASTEWATER TREATMENT SYSTEM WITH ULTRAVIOLET UNIT

BACKGROUND OF THE INVENTION

Home wastewater treatment is an economical option for homes that are located in areas without access to a city sewage system, or where the costs of hooking a home into a city sewage system are prohibitive. Home wastewater treatment systems perform similar functions as a sewage plant, but on a much smaller scale. These systems are typically located underground near the home. After the wastewater has been treated it is typically discharged on the property. It is essential that the wastewater is cleansed sufficiently so that the discharged water does not pose a threat to the environment.

Many home wastewater treatment systems rely on an aerated chamber to help clean the water. Home wastewater naturally contains bacteria which work to digest the waste. Adding air to the wastewater in the aeration chamber causes more oxygen to dissolve in the water. This increased concentration of oxygen allows the bacteria to grow and multiply more rapidly, which in turn allows for the bacteria to break down waste more rapidly, thereby increasing the efficiency of the system. The benefit of using bacteria is that it reduces the need to use chemicals for treatment; eliminating chemicals saves money and is better for the environment. The drawback of using bacteria is that releasing high concentrations of bacteria can be detrimental to the environment.

One common way of killing the bacteria is to build a chlorination unit into the treatment system. Adding chlorine to the water before it is discharged serves to kill much of the bacteria. Unfortunately, chlorine is also harmful to the environment.

A better method of killing the bacteria is to expose the discharge water to ultraviolet light. When bacteria and other microorganisms are exposed to UV light, they are effectively killed thereby preventing harm to the environment. Further, UV light does not add any harmful chemicals or additives to the water, being an environmentally friendly alternative to chlorine.

Currently, some home wastewater treatment systems utilize UV disinfection devices. These systems have several limitations. The biggest shortfall is that the UV system is an add-on buried outside the main treatment tank at or near the discharge outlet. Exposure to moisture can lead to UV system failure. Locating the UV system outside the tank can increase failure rates and increase installation and maintenance costs.

The present treatment system overcomes the afore-stated problems by locating the UV system within the main wastewater treatment tank. In this configuration: bacteria are neutralized without adding chemicals, the UV system is protected, UV system failure rate is reduced, installation costs are lowered, and maintenance is simplified.

SUMMARY OF THE INVENTION

The present invention is a wastewater treatment system having a treatment tank with an inlet and an outlet, an aeration chamber with an aerator therein to provide air to the wastewater, a clarification chamber to remove any residual solids, and an ultraviolet disinfection system to neutralize any microorganisms in the outlet stream. Typically, the treatment system is installed underground and has an access assembly to provide entry for maintenance and inspection.

Wastewater can enter the treatment tank either directly from the house or from another source such as a pre-treatment tank. Once in the treatment tank, bacterial growth may be encouraged such as by aeration to break down the waste in the wastewater. The wastewater then enters a clarifying chamber which allows for any residual solids to settle out of the wastewater. Wastewater exits the clarifying chamber through an outlet tube.

A UV system is mounted within the treatment tank and is in fluid communication with the clarifying chamber such that the UV system treats the wastewater as it exits the clarifying chamber.

It is an object of the present invention to provide a wastewater treatment system which neutralizes bacteria and other microorganisms in the discharge stream.

It is an object of the present invention to use an ultraviolet system to disinfect the wastewater discharge stream.

It is an object of the present invention to place the UV system inside the primary wastewater treatment tank.

It is an object of the present invention to protect the UV system from failure.

It is an object of the present invention to minimize the installation costs of the treatment system.

It is another object of the present invention to allow access to the UV system, the clarifying chamber, the aeration chamber and the aerators through the access portal of the wastewater treatment system.

DESCRIPTION OF THE PREFERRED EMBODIMENT

Figure 1:
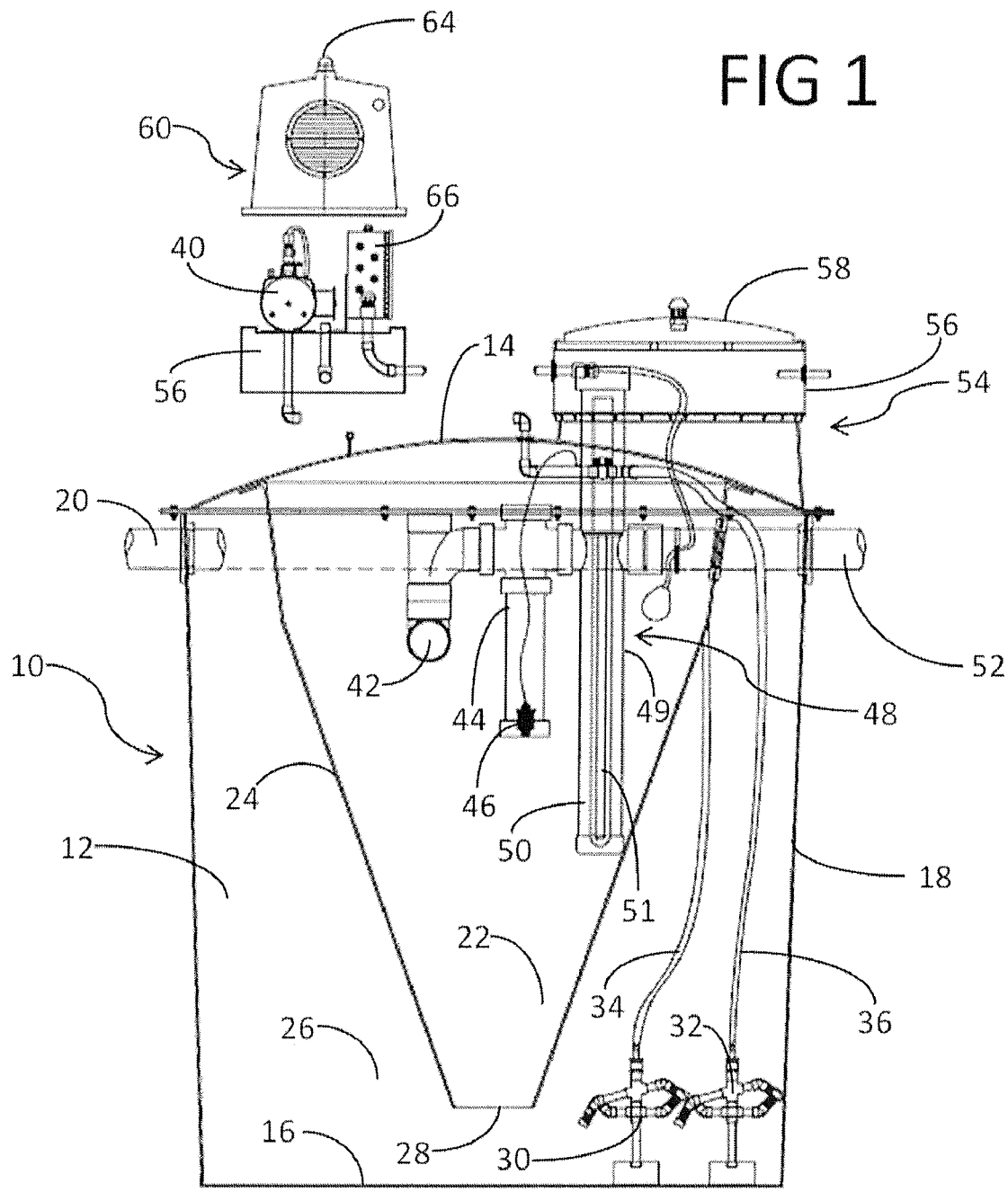
FIG. 1 is a sectional side view showing the wastewater treatment system of the present invention.

FIG. 1 shows the wastewater treatment system 10 of the preferred embodiment. Wastewater treatment system 10 incorporates a treatment tank 12 having a top 14, a bottom 16, and an enclosing wall 18. Treatment tank 12 has a wastewater inlet tube 20 which passes through enclosing wall 18 at a position near top 14 of treatment tank 12. Wastewater inlet tube 20 allows wastewater to enter treatment tank 12 and is connected to a wastewater source.

Treatment tank 12 is separated into two chambers by a frusto-conical structure 24. An aeration chamber 26 is located in the space between frusto-conical structure 24 and enclosing wall 18 of treatment tank 12. A clarifying chamber 22 is located inside frusto-conical structure 24. The bottom of the frusto-conical structure 24 forms a clarifying chamber opening 28.

Aeration chamber 26 contains an aerator 30 and an aerator 32. Aerator 30 and aerator 32 are connected to the air discharge lines 34 and 36 respectively. Air discharge lines 34 and 36 are connected to an air pump 40. Aerators 30 and 32 receive air from pump 40 which causes oxygen to enter the wastewater in aeration chamber 26. The oxygen injected by aerators 30 and 32 is used by bacteria and other microorganisms contained in the wastewater to break down waste in the wastewater.

The conical shape of frusto-conical structure 24 allows residual solid matter in the wastewater in clarifying chamber 22 to settle out of the wastewater and drop back down to aeration chamber 26 for further aeration.

A clarifying chamber outlet tube 52 is partially located in clarifying chamber 22 having an inlet 42 within the clarifying chamber and extending outwardly from the chamber and through enclosing wall 18 of treatment tank 12. The wastewater passing from the clarifying chamber through outlet tube 52 is treated by a disinfection subsystem. The disinfection subsystem is composed of treatment units used to prepare the wastewater for discharge from treatment tank 12. The disinfection subsystem includes either a re-aeration unit 44, or a UV treatment unit 48 or both. Wastewater exits the disinfection subsystem through outlet tube 52.

Re-aeration unit 44 contains an aerator 46 which is connected to pump 40. Pump 40 provides air to aerator 46 which adds oxygen to the wastewater passing through re-aeration unit 44. Re-aeration unit 44 is connected to outlet tube 52 with wastewater passing through re-aeration unit 44 prior to exiting treatment tank 12.

UV treatment unit 48 includes a housing 49 which is positioned vertically within treatment tank 12. Housing 49 contains an interior fluid pathway 50 which is in wastewater fluid communication through outlet tube 52. A UV light 51 is positioned within housing 49 in pathway 50. Wastewater passing through interior fluid pathway 50 of housing 49 is subject to the UV emission from light 51, thereby neutralizing the bacteria or other microorganisms within the wastewater.

An access assembly 54 is position on the top 14 of treatment tank 12. Access assembly 54 is formed of a generally vertical enclosing wall 56 and has a removable lid 58. Access assembly 54 is located over an opening 68 in top 14 of treatment tank 12 which provides access to the wastewater treatment components in the tank. Access assembly 54 is positioned above clarifying chamber 22 and a portion of aeration chamber 26 such that access to both chambers is possible through the access assembly.

Treatment tank 12 is designed such that it can be buried in the earth leaving a portion of access assembly 54 exposed so as to allow maintenance of components or testing of the contents of treatment tank 12 by removing lid 58 and reaching down through access assembly 54 into treatment tank 12.

UV treatment unit 48 extends from within treatment tank 12 up into access assembly 54. Placement of UV treatment unit 48 in and below access assembly 54 allows ready access for maintenance on UV treatment unit 48.

An electric controller 66 controls, monitors and powers various systems incorporated into the wastewater treatment system 10, such as pump 40 and UV treatment unit 48. The electric controller 66 receives electricity from an external power source. A platform 56 holds pump 40 and electric controller 66. Platform 56 may be remotely located or carried externally by tank 12. A cap or housing 60 extends from platform 56 over pump 40 and electric controller 66. Housing 60 may incorporate an alarm beacon 64 which is connected to electric controller 66 to provide the user with notice that maintenance may need to be performed on a component of the system.

Figure 2:
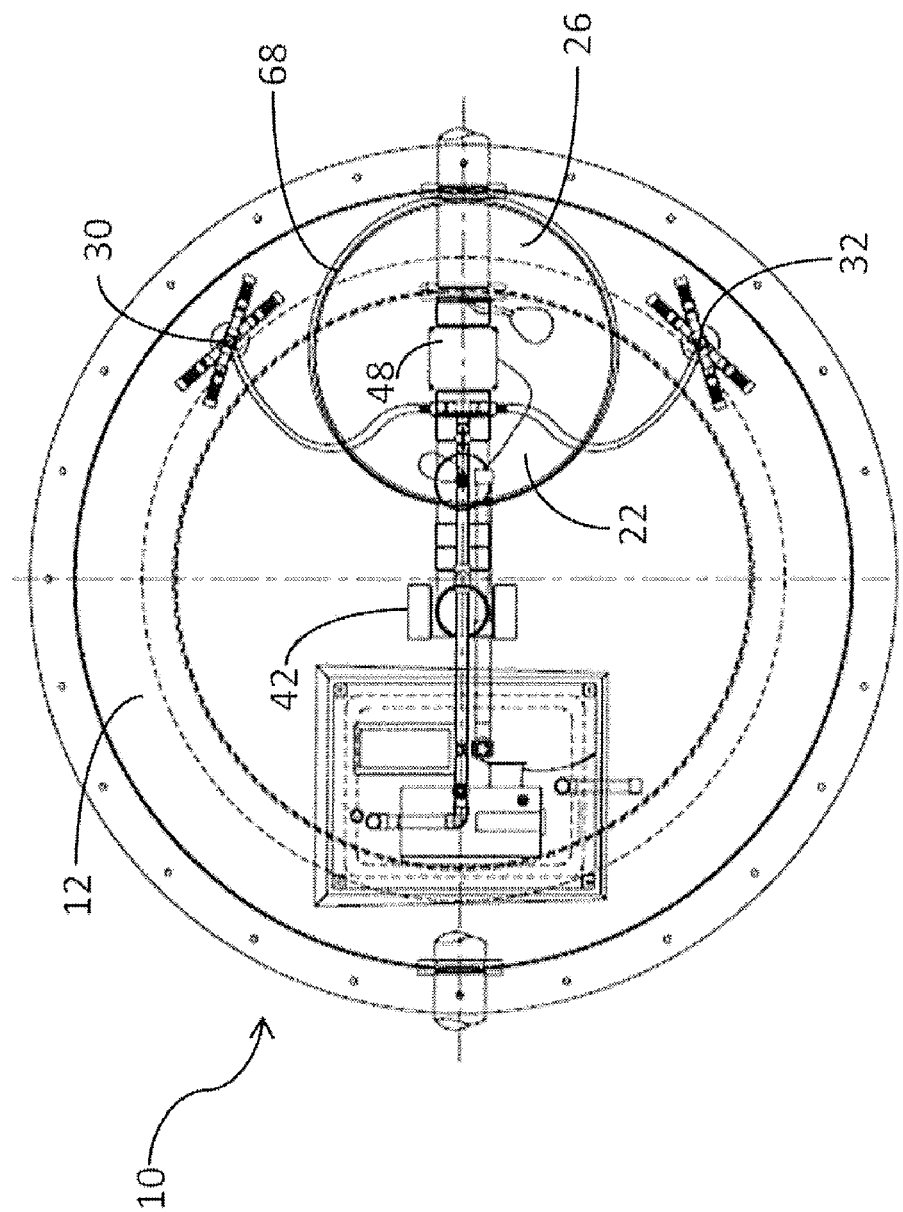
FIG. 2 is a view from above showing the wastewater treatment system of FIG. 1 with its top removed for illustrative purposes.

FIG. 2 shows the wastewater treatment system 10 as viewed from above. This view shows an opening 68 through top 14 of treatment tank 12 and through which access to UV treatment unit 48, aeration chamber 26 and clarifying chamber 22 is provided. This view shows the placement of inlet 42 within clarifying chamber 22. This view also shows the preferred placement of aerator 30 and aerator 32 within aeration chamber 26.

Figure 3:
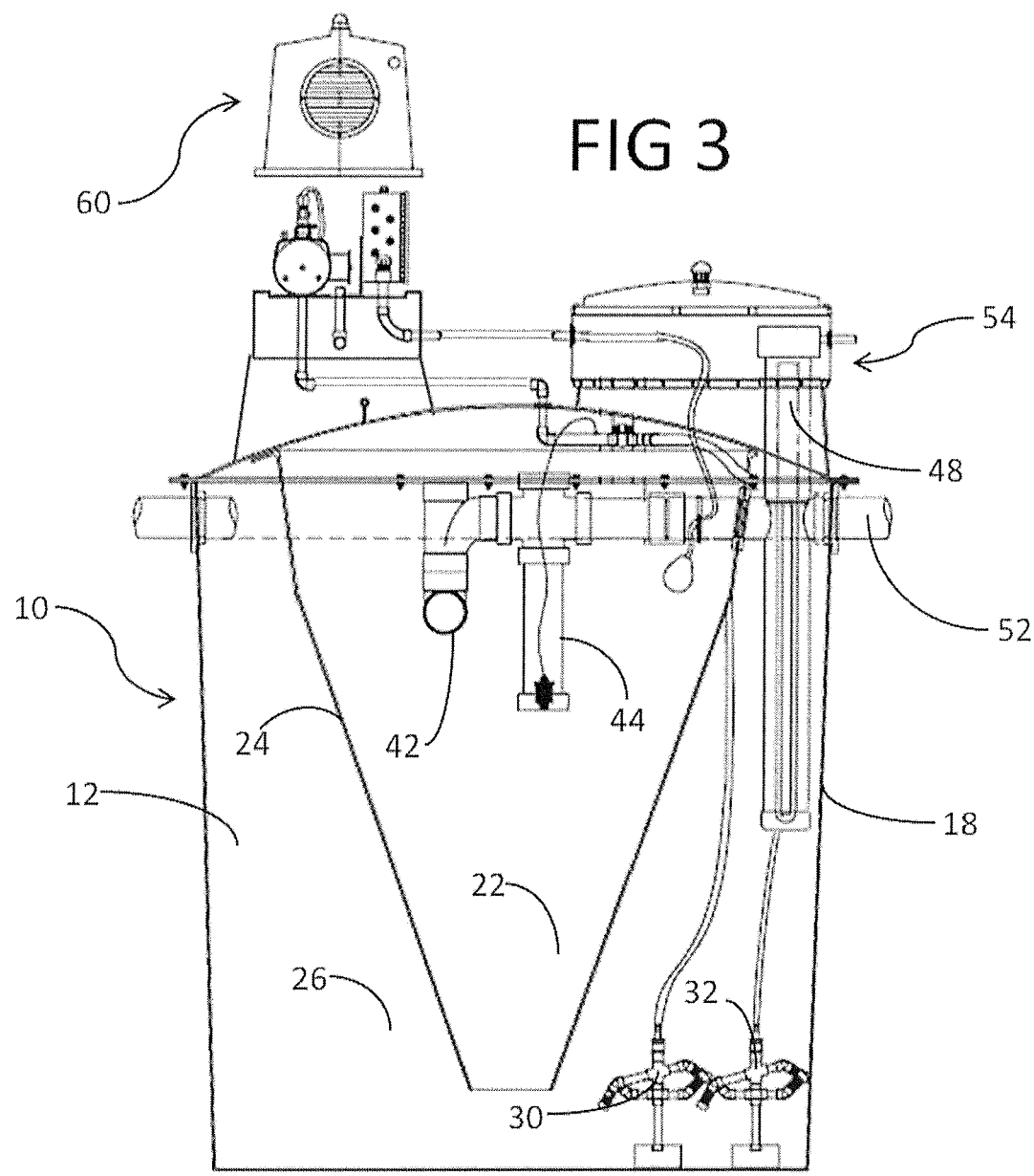
FIG. 3 is a sectional side view of an alternative embodiment of the present invention.

FIG. 3 shows another embodiment of wastewater treatment system 10. In this embodiment the components are the same as in FIG. 1, except UV treatment unit 48 has been moved from clarifying chamber 22 into aeration chamber 26. In this embodiment the fluid pathway is identical to that of FIG. 1, the only change being the placement of UV treatment unit 48 relative to frusto-conical structure 24. In this embodiment the UV treatment unit is supported by outlet tube 52 adjacent to enclosing wall 18. This alternative embodiment provides different access options to the contents of treatment tank 12 including clarifying chamber 22, aeration chamber 26, UV treatment unit 48 and aerators 30 and 32. These additional access options are beneficial since access assembly 54 only allows a limited opening, and such differing placement alternatives of the interior units may be needed to meet the particular needs of each user.

The foregoing disclosure and description of the invention are illustrative and explanatory thereof. Various changes in the details of the illustrated construction can be made within the scope of the appended claims without departing from the true spirit of the invention. The present invention should only be limited by the following claims and their legal equivalents.

What is claimed is:

1. A wastewater treatment system comprising:
a treatment tank defined by a top, a bottom, and an enclosing wall, said treatment tank having a tank inlet through which wastewater enters said treatment tank, said treatment tank having a clarified water outlet tube through which said wastewater exits said treatment tank;
a clarifying chamber positioned within said treatment tank, said clarifying chamber formed in a generally upright frusto-conical shape having an open lower end in fluid communication with said treatment tank, said clarifying chamber in fluid communication with said water outlet tube;
an access assembly extending from said top of said treatment tank, said access assembly including a removable lid and having an open bottom, said access assembly positioned above an opening in said top allowing access into said treatment tank;
an aeration column so as to provide air to said wastewater, said aeration column connected in-line with and carried by said water outlet tube allowing said wastewater to pass through said aeration column; and
a UV disinfector so as to disinfect said wastewater using ultraviolet light, said disinfector located within said clarifying chamber, said disinfector positioned so as to be accessible through said access assembly, said disinfector connected in-line with said water outlet tube allowing said wastewater to pass through said disinfector, said disinfector carried by said water outlet tube.

2. A wastewater treatment system comprising:
a treatment tank defined by a top, a bottom, and an enclosing wall, said treatment tank having a tank inlet through which wastewater fluid enters said treatment tank;
a clarifying chamber positioned within said treatment tank, said clarifying chamber formed in a generally upright frusto-conical shape having an open lower end in fluid communication with said treatment tank, said clarifying chamber having a clarified water outlet tube which extends through said enclosing wall through which treated wastewater fluid leaves said clarifying chamber and said treatment tank;
an access assembly extending from said top of said treatment tank, said access assembly including a removable lid and having an open bottom, said access assembly positioned above an opening in said top, said access assembly allowing access into said treatment tank; and
a disinfection subsystem for treating said wastewater fluid, said disinfection subsystem located within said treatment tank and in-line with said outlet tube and in fluid communication therewith, said disinfection subsystem so positioned such that it can be accessed through said access assembly, said disinfection subsystem carried by said outlet tube, said disinfection subsystem positioned within said clarifying chamber.

* * * * *